UNITED STATES PATENT OFFICE.

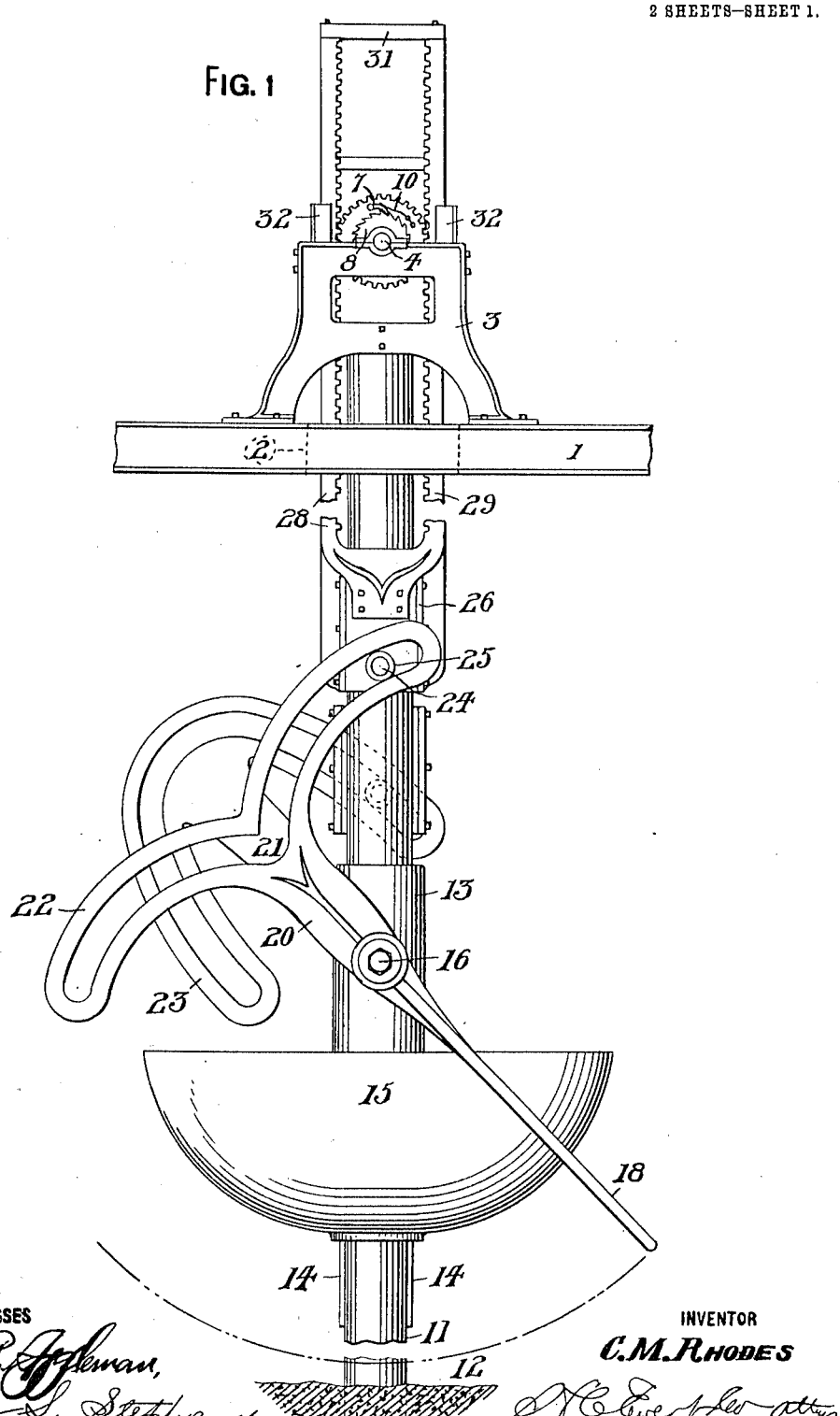

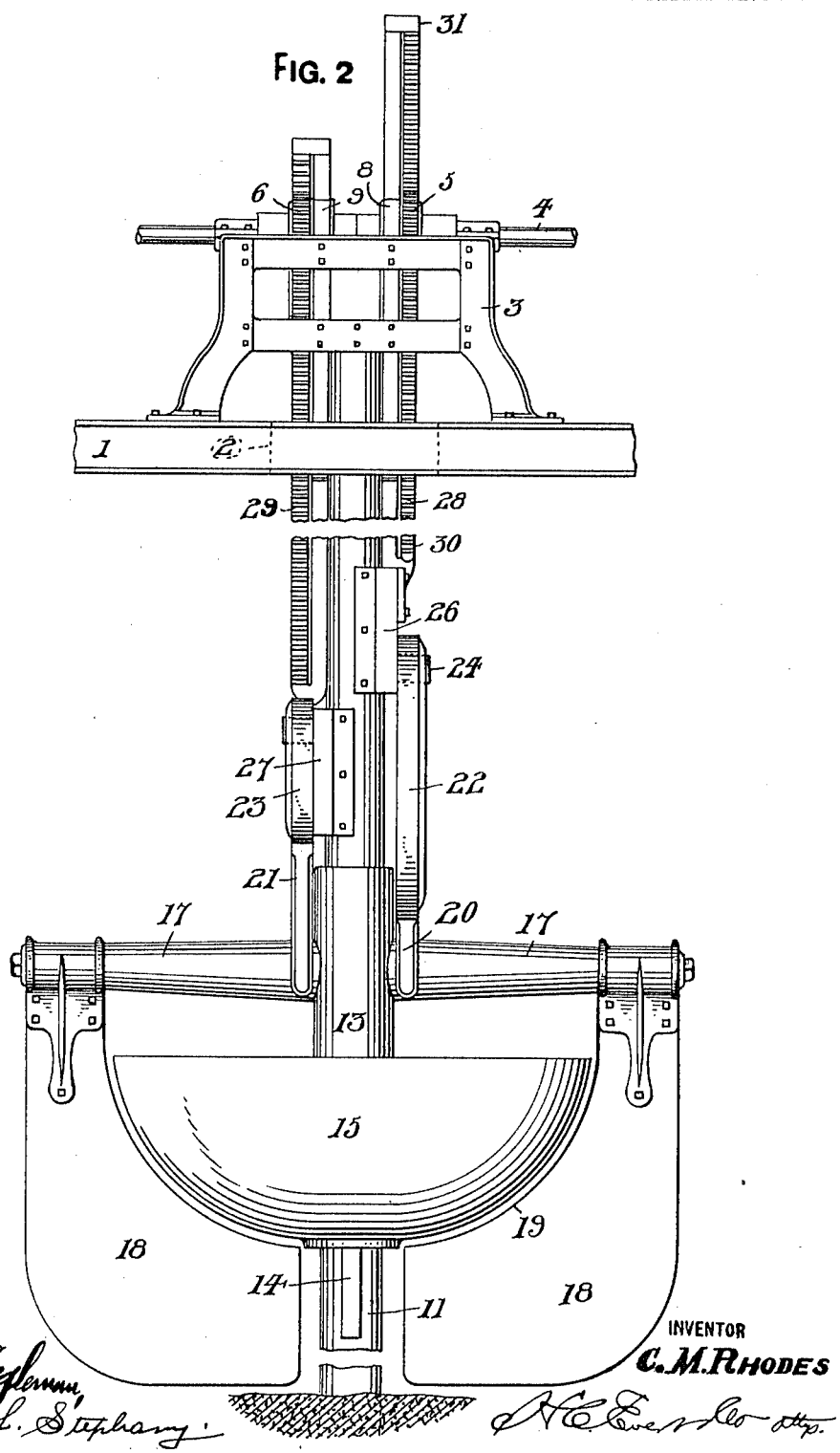

CHARLES M. RHODES, OF STEUBENVILLE, OHIO.

WAVE-ENERGY MOTOR.

1,001,444. Specification of Letters Patent. Patented Aug. 22, 1911.

Application filed September 23, 1910. Serial No. 583,366.

*To all whom it may concern:*

Be it known that I, CHARLES M. RHODES, a citizen of the United States of America, residing at Steubenville, in the county of Jefferson and State of Ohio, have invented certain new and useful Improvements in Wave-Energy Motors, of which the following is a specification, reference being had therein to the accompanying drawing.

This invention relates to wave energy motors of the "float" type, and the primary object of the invention is the provision of novel means for obtaining power by the undulatory movement of floats upon ocean waves.

Another object of the invention is the provision of novel means in connection with a float whereby power can be derived from the lateral impulse of a wave in either direction, and furthermore, to provide novel means whereby the power derived from a vertical movement of the float and from the lateral impulse of a wave can be transmitted to impart a rotary movement to a shaft.

A still further object of the invention is to accomplish the above results by a mechanical construction that is simple, durable, capable of withstanding the forces of nature, and efficient for generating power that can be used for various purposes.

With the above and such other objects in view as may hereinafter appear, the invention consists of the novel construction, combination and arrangement of parts to be hereinafter specifically described and then claimed.

Reference will now be had to the drawings, wherein:—

Figure 1 is a side elevation of the motor partly broken away, and Fig. 2 is a front elevation partly broken away.

The reference numeral 1 denotes a pier or suitable elevated structure for supporting the motor a desired and safe distance above the ocean waves, said pier or structure being preferably in communication with the ocean shore, whereby power can be easily transmitted to the shore for manufacturing or electric lighting purposes. The motor can be suitably housed upon the pier or structure and protected from the destructive forces of nature that might render the motor inoperative.

The pier or elevated structure 1 is adapted to support a plurality of compactly arranged units constituting the motor, and in connection with each unit there is a mechanism for imparting a revoluble movement to a shaft located upon the pier or elevated structure 1. Only one unit has been illustrated, but it is to be understood that an indefinite number can be used according to the power to be generated, and as the units are identical in construction, I deem it only necessary to describe one of said units.

The pier or elevated structure 1 is provided with an opening 2 and upon said pier at the sides of the opening 2 is a bearing 3 supporting a revoluble longitudinal shaft 4. Loosely mounted upon the shaft 4 are two pinions 5 and 6 having the confronting sides thereof provided with reversely arranged pivoted pawls 7 normally held in engagement with ratchet wheels 8 and 9 fixed upon the shaft 4, said pawls being retained in engagement with said ratchet wheels by flat springs 10, carried by the inner sides of the pinions 5 and 6.

11 denotes a vertical cylindrical guide post having the lower end thereof suitably anchored in a foundation or in the bed 12 of the ocean, while the upper end of the guide post 11 extends into the bearing 3 of the pier 1.

13 denotes a sleeve slidably mounted upon the guide post 11, said sleeve being prevented from rotating thereon by oppositely disposed vertical guides 14, carried by the post 11. The lower end of the sleeve 13 is provided with a semi-spherical hollow float 15 preferably made of metal, and the upper end of said sleeve has diametrically opposed arms 16 upon which are movably mounted hubs 17. The outer ends of the hubs 17 are provided with depending blades 18, said blades having the outer edges thereof vertical and the upper inner edges thereof cut away, as at 19 to provide clearance for the float 15, whereby said blades can extend into proximity to the guide post 11. The inner ends of the hubs 17 are provided with vertical extensions 20 and 21, the former terminating in a Y-shaped slotted actuating member 22 and the latter in a slotted inverted U-shaped actuating member 23. Extending into the slots of said members are bearings 24 provided with anti-friction rollers 25, said bearings being carried by guide blocks 26 and 27 slidably mounted upon the post 11. The guide blocks 26 and 27 have the upper ends thereof provided with vertical racks 28 and 29 meshing with the pinions 5 and 6 respectively. Each rack has a guide bar 30 and the top of each guide bar is connected to the top of its rack by a cross head 31. The guide bars 30 slide through guides 32, carried by the bearing 3.

In operation, the raising and lowering of the float 15 raises and lowers the racks 28 and 29 through the medium of the actuating members, but these actuating members will further facilitate the movement of the bars when the blades 18 are oscillated by the lateral impulse of a wave. The rack 29 when elevated will impart a rotary movement to the shaft 4 in one direction, and when the rack 29 is lowered the shaft will continue to revolve in the same direction while the rack 28 and the pinion 5 are idle.

It is apparent that I have devised a ratchet mechanism and novel means for alternately operating the mechanism by the reciprocatory movement of the float and the oscillatory movement of the blades attached thereto, and while in the drawings there is illustrated a preferred embodiment of the invention, it is to be understood that the structural elements thereof are susceptible to such changes as fall within the scope of the appended claims.

What I claim is:—

1. In a wave energy motor, a guide post, a float guided by said post, vertical racks adapted to be moved by said float, a revoluble shaft, a ratchet mechanism actuated by said racks for imparting a rotary movement to said shaft, and blades supported adjacent to said float and adapted to move said racks independently of said float.

2. In a wave energy motor, the combination with a pier, a shaft revolubly mounted upon said pier, and ratchet mechanism carried by said shaft for rotating said shaft in one direction, of a float, vertical racks adapted to be moved by said float to alternately actuate said ratchet mechanisms, means for guiding said float, and means carried adjacent to said float for actuating said racks independently of said float.

3. In a wave energy motor, the combination with a pier, a shaft revolubly mounted upon said pier, and ratchet mechanism carried by said shaft for rotating said shaft in one direction, of a float, vertical racks adapted to be moved by said float to alternately actuate said ratchet mechanisms, means for guiding said float, and means adjacent to said float for actuating said racks independently of said float, said means including oppositely disposed trunnioned blades, and slotted actuating members in connection with and indirectly connected to said racks.

4. In a wave energy motor, the combination with a pier, a revoluble shaft carried thereby, and ratchet mechanisms supported by said shaft and adapted to rotate said shaft in one direction, of a guide post beneath said pier, a float movably mounted upon said post, guide blocks slidably mounted upon said post, vertical racks carried by said blocks and extending upwardly through said pier and adapted to alternately actuate said ratchet mechanisms, oppositely disposed trunnioned blades adjacent to said float, slotted actuating members carried by said blades, and oppositely disposed bearings carried by said blocks and extending into said members, substantially as, and for the purpose herein described.

5. In a wave energy motor, a guide post, a vertically movable float slidably-mounted upon said post and actuated by a wave, vertical racks, elements carried by the float and engaging with the racks for vertically moving them when the float is operated, means shiftable by the waves for actuating said racks independent of the movement of the float, a revoluble shaft, and means actuated by said racks for imparting a rotary movement to the shaft.

6. In a wave energy motor, a guide post, a vertically movable float slidably-mounted upon said post and actuated by a wave, vertical racks, elements carried by the float and engaging with the racks for vertically moving them when the float is operated, oscillatory means shiftable by the waves for actuating said racks independent of the movement of the float, a revoluble shaft, and means actuated by said racks for imparting a rotary movement to the shaft.

7. In a wave energy motor, a guide post, a float slidably-mounted thereon and moved by the action of waves, racks, elements carried by the float and movable therewith and engaging with the racks for moving them, oscillatory means suspended from the float and connected with said elements for operating them independent of the movement of the float thereby shifting the racks, a revoluble shaft, and means operated by said racks for imparting a rotary movement to the shaft.

8. In a wave energy motor, a vertically-movable float actuated by the movement of the waves, guiding means for the float, shiftable racks, elements actuated by the movement of the float and connected with said racks for shifting them during the movement of the float, oscillatory means connected with said elements for actuating them independent of the movement of the float, said oscillatory means operated by the movement of the waves, a revoluble shaft, and means actuated by said racks for imparting a rotary movement to said shaft.

In testimony whereof I affix my signature in the presence of two witnesses.

CHARLES M. RHODES.

Witnesses:
 E. STANTON PEARCE,
 CHARLES A. VAIL.